May 4, 1954     E. A. LARSSON     2,677,472
AUTOMATIC CAR AND AIR COUPLER
Filed Aug. 12, 1948     3 Sheets-Sheet 1

INVENTOR.
ERNST A. LARSSON.
BY
*Richey Watts*
ATTORNEYS

May 4, 1954

E. A. LARSSON 2,677,472

AUTOMATIC CAR AND AIR COUPLER

Filed Aug. 12, 1948

INVENTOR.
ERNST A. LARSSON.
BY
Richey Watts
ATTORNEYS

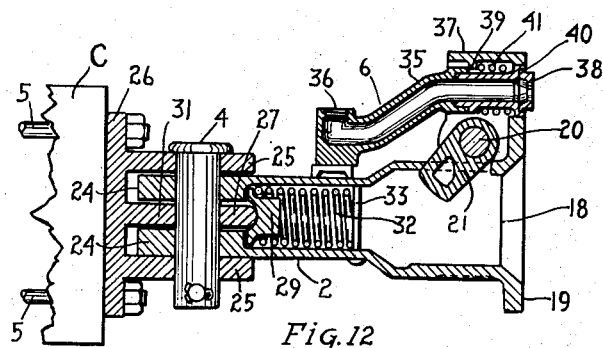
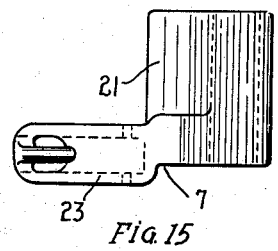
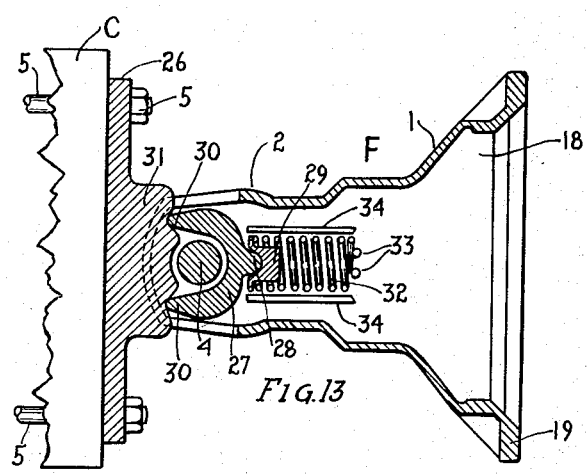
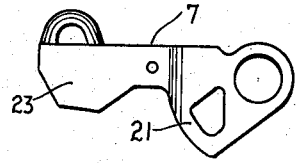
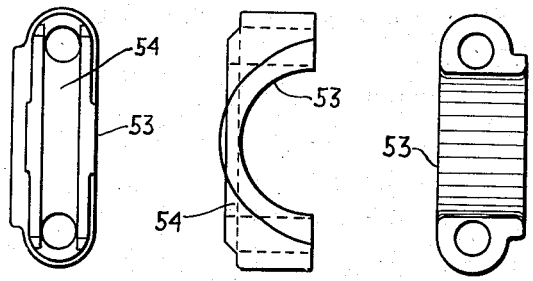

Patented May 4, 1954

2,677,472

UNITED STATES PATENT OFFICE 2,677,472

AUTOMATIC CAR AND AIR COUPLER

Ernst A. Larsson, Mansfield, Ohio, assignor to The Ohio Brass Company, Mansfield, Ohio, a corporation of New Jersey Application August 12, 1948, Serial No. 43,799

25 Claims. (Cl. 213—76)

This invention relates to car and air couplers and has particular reference to couplers to connect cars used in mines and about industrial works.

Such cars up to now, particularly those used in mines, have not been equipped with air brakes but with the recent introduction of air brakes on such cars it became necessary to provide a combined car and air coupler where automatic coupling is desired.

One of the principal objects of my invention is to provide a coupler which will couple not only the adjacent cars but will also connect the air lines on those cars, and to do so automatically.

The car coupler is of the male and female type as disclosed in my U. S. Patent 2,235,618 and the male coupler is provided with means whereby one of two coupled cars may be rotated relative to the other in order to dump the same, also each coupler is provided with means to align the same with the longitudinal axis of the car.

Further objects and advantages will appear and be brought out fully in the specification, reference being had to the accompanying drawings, in which:

Fig. 12 is a vertical longitudinal section of the uncoupled female coupler taken on the line A—A of Fig. 2.

Fig. 13 is a horizontal longitudinal section of the uncoupled female coupler on the line 13—13 of Fig. 1A.

Fig. 14 is a side view of the coupler lock.

Fig. 15 is a top plan view of the coupler lock.

Fig. 16 is an edge view of a split collar which holds the male head and its draw-bar in connected and relative rotational relation.

Fig. 17 is a side or face view of Fig. 16.

Fig. 18 is an inner view of Fig. 16.

Figures 1A, 1B:
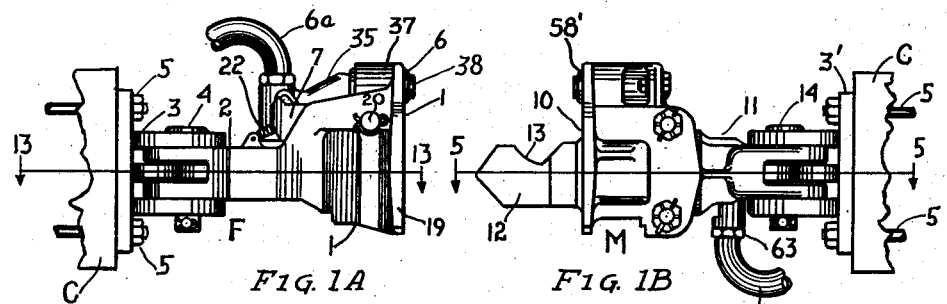
Figs. 1A and 1B are respectively side views of two couplers each shown as attached to a car bumper and held in position to be coupled, the right-hand coupler 1B being of the male type.
Figure 2:
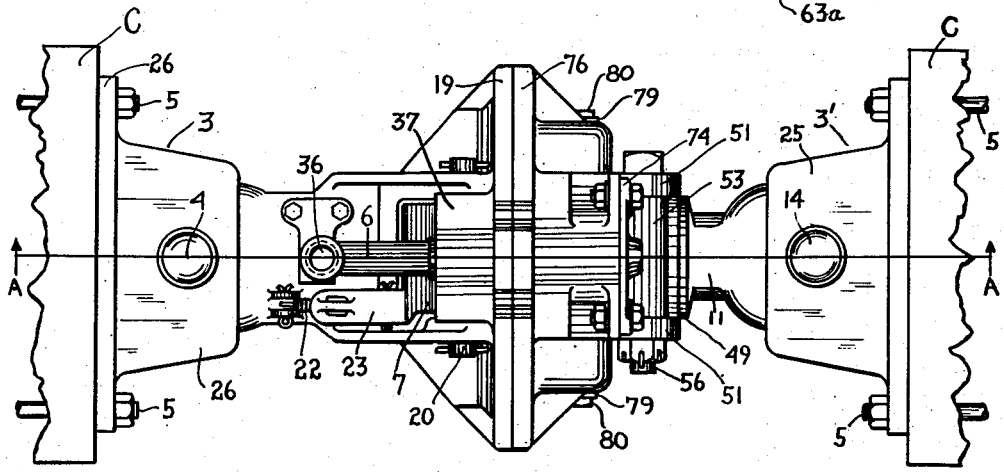
Fig. 2 is a top view of two couplers in fully coupled relation and each attached to a support, as for instance the car bumper.
Figure 3:
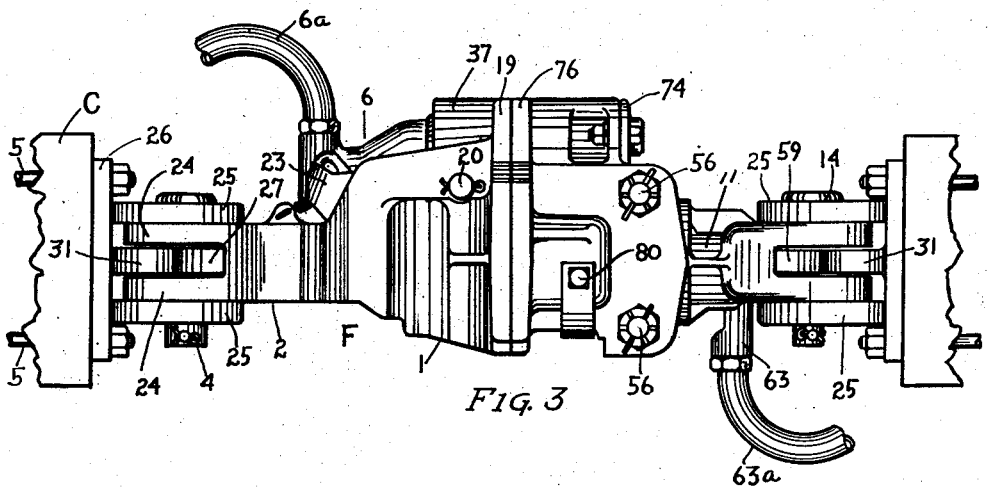
Fig. 3 is a side view in elevation of two couplers in coupled relation and each attached to a support for instance the car bumper.

The preferred embodiment of this invention comprises couplers of the general type shown in U. S. Patent No. 2,225,418 modified sufficiently to include the air connecting portion. Coupler assemblies of the general type shown in the above patent comprising male and female type heads permit of a very short construction which is quite essential in mine haulage and also facilitates in coupling on curves of short radii, in which case the longitudinal axis of the adjacent cars are disposed at a very considerable angle.

The female coupler F comprises in general a head portion 1 with an integrally connected draw-bar portion 2, projecting rearwardly therefrom and the anchorage portion 3 pivotally attached to the draw-bar 2 by the pin 4 and to the car C by bolts 5.

The coupler F is also provided with air connecting means including a conduit 6 communicating with a brake fluid pressure hose 6a carried by car C and further has a spring lock 7 held normally in its locking position.

The male coupler M comprises in general a head portion 10 with a separately formed drawbar 11 connected to and projecting rearwardly from the head portion 10 in axial alignment therewith and rotatable relative thereto upon the common longitudinal axis of the head and draw-bar portions. The head is provided with an integrally formed tongue 12 projecting therefrom and having a cross slot 13.

The draw-bar 11 is pivotally attached to the anchorage 3 by the bolt 14 and secured to the car D by the bolts 5.

The head portion 1 of the female coupler F shown in section in Figs. 12 and 13 is provided with a flaring opening 18 arranged to receive the projecting tongue 12 on the male head. The opening 18 is surrounded by a flange 19 forming an abutment face for the male head.

Pivotally mounted on the head 1 by a transverse pin 20 is the lock 7 having a cam 21 Fig. 14 held in locking position by a spring 22 and opened manually by means of a handle 23.

When the two couplers are brought together the cam 21 will be automatically moved out of its locking position by the tapered nose on the tongue 12 and will be moved back into the slot 13 by the spring 22 when the couplers are in coupled relation thereby holding the heads in tight coupled relation.

The rear end of the draw-bar 2 is provided with two spaced lugs 24 which fit between the lugs 25 on the anchorage plate 26. The lugs are provided with registering openings for the pin 4 which permits radial movement of the coupler F in a horizontal plane.

The coupler F is provided with a centering link 27 positioned between the lugs 24 and having a pivot 28 to engage the bearing 29 and also having two fulcrums 30 bearing against the flange 31 on the anchorage 3 when the coupler head F is in its normally central position as shown in Fig. 13.

To effect the centering of the coupler F, the draw-bar 2 is provided with a spring 32 held under compression between the fixed members 33 and the bearing 29 and fixed guides 34 whereby the spring is further compressed when the coupler is moved from its centered position thereby exerting increased pressure and moving the coupler to its centered position.

The conduit 6 is resiliently mounted on the upper side of head 1 of the female coupler so as to have limited longitudinal movement relative to said head. One end 36 of conduit 6 is shown threaded for connection to hose 6a and the other end is mounted in a guide 37 associated with flange 19 above opening 18 and is held in forward position with the outer or free end 38 projecting beyond the face of the flange 19 of said head.

The guide 37 is provided with a flange 39 and the conduit with a shoulder 40 and a spring 41 is mounted under compression between the said flange and shoulder. The end 38 of the conduit may be a removable rubber gasket.

When the couplers F and M are brought together in coupled or interlocking relation, conduit 6 is moved backward against spring 41 through pressure upon end 38 by the counterpart conduit member in register therewith and carried by the connected coupler M.

The draw-bar 11 of the male coupler M is an elongated hollow cylinder-like member (Fig. 10) with a pair of spaced lugs 45 at one end having registering openings 46 therethrough to receive the pin 14 on the anchorage 3'.

The anchorage 3' is constructed, arranged and attached to the clevis end of the draw-bar 11 and to the car D as in the case of the anchorage 3 and the like parts of the two anchorages are therefore numbered alike and further description thereof is probably unnecessary.

Figure 10:
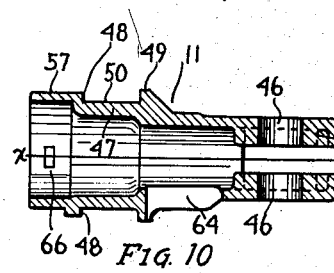
Fig. 10 is a vertical section of the draw-bar only shown in Fig. 4.

Mounted adjacent the free end of the draw-bar 11 is the head 10 in rotatable relation thereto about the longitudinal axis X—X of the draw-bar 11 (Fig. 10). The portion 47 of the draw-bar is provided with spaced shoulders 48 and 49 forming therebetween a bearing 50 upon which the head may rotate relative to the draw-bar.

The head (Fig. 8) is provided with two rearwardly extending arms 51 each having a slot 52 and together constituting a shank.

Mounted on the bearing 50 between the shoulders 48 and 49 is a split collar 53 (Figs. 6, 16, 17, 18) and which also engages the inner surface of the arms 51, the collar portions are each provided with a slot 54 which registers with the slots 52 and in which is positioned the key 55 thereby locking the head 10 to the split collar 53 thereby locking the head to the draw-bar 11 through the collar 53.

The keys 55 extends only between the bolts 56. The bolts 56 hold the above several parts together as in Fig. 6. The head 10 is also supported by the end portion 57 of the draw-bar which is mounted in the cylindrical portion 58 of the head.

Figure 5:
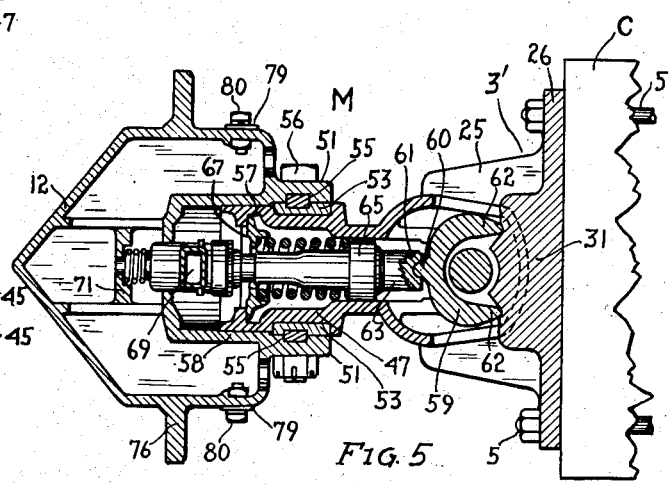
Fig. 5 is a partial horizontal longitudinal section of the uncoupled male coupler on the line 5—5 of Fig. 1B.

The air connecting mechanism comprising a conduit 58' made up of several segments cooperates with mechanism for effecting the centering of the head and which comprises the centering link 59 positioned between the lugs 45 and having a pivot 60 which engages the bearing 61 and also having two fulcrums 62 bearing against the flange 31 on the anchorage 3' when the coupler head M is in its normally central position as shown in Fig. 5.

The bearing 61 is associated with the segment or portion 63 of said conduit 58' which projects forwardly and downwardly the latter extending through the slot 64 in the draw-bar 11. The slot 64 is sufficiently long to permit longitudinal movement of the portion 63 relative to the draw-bar.

The portion 63 has means at its lower end for attachment of a brake fluid pressure hose 63a carried by the car D and at the front horizontal end a threaded connector for attachment to a second conduit portion 65, its longitudinal axis corresponding to axis X—X.

Figure 9:
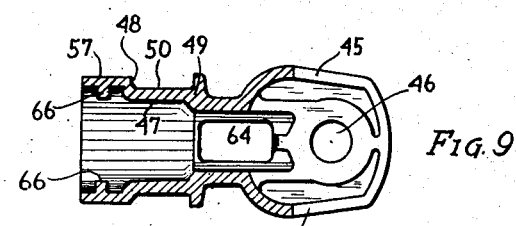
Fig. 9 is a horizontal section of the draw-bar only shown in Fig. 5.

Projecting from the inner surface of the portion 57 of the draw-bar are lugs 66 (Fig. 9) against which rests the flanged collar 67 and through which projects loosely the portion 65 of conduit 58'. Between flanged collar 67 and the enlarged portion of the portion 65 is positioned the centering spring 68 which forces the conduit portions 63 and 65 and the centering link rearwardly thereby to effect the centering of the male head 10 in the same manner as in case of the female head.

Figure 8:
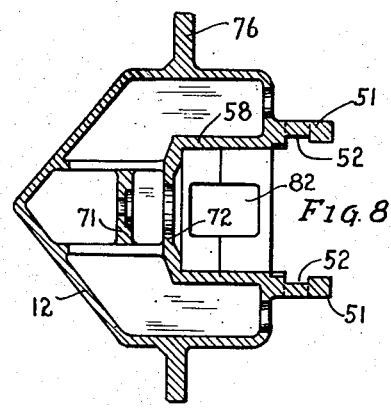
Fig. 8 is a horizontal section of the head portion only of the male coupler shown in Fig. 5.

Associated with the male head 10 and with the forward end of the conduit member 65 is a third upstanding or upwardly extending conduit portion 69 in slidable and rotatable relation thereto and surrounding the extreme end of the portion 65. The lower end of portion 69 is constantly urged rearwardly by the spring 70 pressing against the recessed flange 71 and guided by the flange 72 (Fig. 8).

Figure 11:
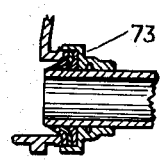
Fig. 11 is an enlarged portion of the packing arrangement between the air conduits shown in Fig. 4.
Figure 4:
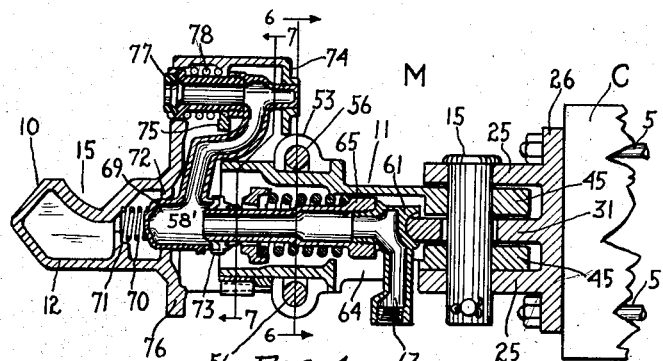
Fig. 4 is a partial vertical longitudinal section of the uncoupled male coupler taken on the line A—A of Fig. 2.
Figure 6:
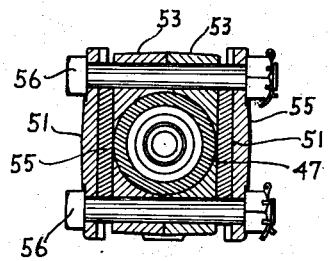
Fig. 6 is a partial transverse section of the male coupler on the line 6—6 of Fig. 4 showing the swivel connection between the head and drawbar.

The said joint between the portions 65 and 69 is made airtight by the joint packing 73 (Fig. 11). The portion 69 is guided and supported at its upper end by the removable plate 74 and flange 75.

The forward upper end of the portion 69 normally projects through an opening in the flange 76 which also acts as an abutment for the flange 19 on the female coupler F. The portion 69 has a projecting free end portion 77 usually of a resilient material arranged to engage the free end 38 of the conduit 6 on the female coupler when two couplers are in coupled relation, in which case the portion 69 is moved rearwardly against the spring 78. Portions 77 and 38, in other words, are in register when heads 10 and 1 are disposed for interlocking engagement or are actually engaged.

Figure 7:
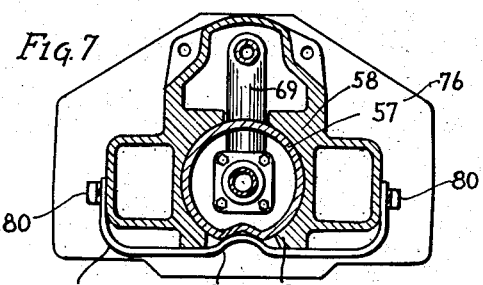
Fig. 7 is a partial transverse section of the male coupler on the line 7—7 of Fig. 4 showing the yielding lock between the head and draw-bar.

In order to yieldingly hold the male head 10 in position relative to its draw-bar for coupling with the female head F but also permit the head 10 and conduit portion 69 to rotate relative to the draw-bar about the axis X—X when it is desired to dump a coupled car; the male head is provided with a yielding strap spring 79 held to the head by bolts 80 (Fig. 7). The spring 79 is formed with a hump at 81 which extends through the opening 82 in the portion 57 of the draw-bar 11 and engages in a depression in the forward end of draw-bar 11.

Since the conduit portion 69 rotates with the head 10, it is necessary that it rotates relative to the portion 65 about the axis X—X.

Having thus described the present invention so that those skilled in the art may be able to understand and practice the same, I state that what I desire to secure by Letters Patent is defined in what is claimed.

What is claimed is:

1. In combination with a pair of cars equipped with fluid pressure hoses, a coupler assembly for joining the cars together and simultaneously, automatically connecting said hoses together in fluid-tight communicating relation, said assembly comprising a male head having an elongated shank portion mounted at one end of a car for rotation about the longitudinal axis of said shank portion, a female head carried at an end of the other car for interlocking engagement with said male head, and means connecting said hoses when the heads are interlocked, said means comprising a conduit communicating with one of the hoses and carried by the female head, and a second conduit carried by the male head and communicating with the other hose, said conduits having free end portions projecting from the respective heads and being in register when the heads are disposed for said interlocking engagement, and said second conduit having a portion rotatable relative to said male head.

2. In combination with a pair of cars equipped with fluid pressure hoses, a coupler assembly for joining the cars together and simultaneously, automatically connecting said hoses together in fluid-tight communicating relation, said assembly comprising a draw-bar pivoted to an end of one car, a male head having an elongated shank portion secured to the draw-bar for rotation about the longitudinal axis of said shank portion, a female head carried at an end of the other car for interlocking engagement with said male head, and means connecting said hoses when the heads are interlocked comprising a conduit communicating with one of the hoses and carried by the female head, and a second conduit extending through the draw-bar and communicating with the other hose, said conduits having resilient free end portions projecting from the respective heads and being in register when the heads are disposed for said interlocking engagement, and said second conduit having a portion rotatable relative to said male head and extending longitudinally of the draw-bar.

3. In combination with a pair of cars equipped with fluid pressure conducting means, a coupler assembly for joining the cars together and simultaneously, automatically connecting said conducting means together in fluid-tight communicating relation, said assembly comprising a draw-bar pivoted to an end of one car, a male head carried by the draw-bar for rotation about a substantially horizontal axis, a female head carried at an end of the other car for interlocking engagement with said male head, and means connecting said conductor means when the heads are interlocked, said connecting means comprising a conduit communicating with a segment of the conductor means carried by the female head, and a second conduit carried by the male head extending through the draw-bar and communicating with a segment of the conductor means carried by said male head, said conduits having resilient free end portions projecting from the respective heads and being in register whereby communication is automatically established when the heads move into said interlocking engagement, and said second conduit having a portion rotatable relative to the male head and extending longitudinally of the draw-bar and a portion resiliently fixed in position relative to the male head and communicatingly connecting the free end portion of said second conduit and said longitudinally extending portion.

4. A car coupler assembly comprising a male head, a female head for interlocking engagement with said male head, a conduit carried by the female head, and a second conduit carried by the male head for connection automatically and fluid-tightly with the first conduit as said heads interlockingly engage, said conduits having free end portions spaced from the longitudinal axis of the coupler assembly and disposed in register for said communicating connection when the heads are disposed for said interlocking engagement, said second conduit comprising a plurality of segments communicating with each other, one of said segments having a portion disposed coaxially of said assembly and provided with a fluid inlet opening in said portion and coaxial of said assembly, and another of said segments extending transversely of the said assembly and connecting the aforesaid segment to said free end portion of the second conduit.

5. A car coupler assembly comprising a draw-bar, a male head having an elongated shank portion secured to the draw-bar for rotation about the longitudinal axis of said shank portion, a female head for interlocking engagement with said male head, a conduit carried by the female head, and a second conduit extending through the draw-bar and male head for connection automatically and fluid-tightly with the first conduit as said heads are interlockingly engaged, said conduits having free end portions disposed in register for said communicating connection when the heads are disposed for said interlocking engagement.

6. A car coupler assembly comprising a draw-bar, a male head having an elongated shank portion secured to the draw-bar for rotation about the longitudinal axis of said shank portion, a female head for interlocking engagement with said male head, a conduit carried by the female head, and a second conduit extending through the draw-bar for connection automatically and fluid-tightly with the first conduit as said heads interlockingly engage said conduits having resilient free end portions opening at the face of the respective heads and being in register for said communicating connection when the heads are disposed for said interlocking engagement, and said second conduit having a portion rotatable relative to said male head and extending longitudinally of the draw-bar and a portion resiliently fixed in position relative to the male head and communicatingly connecting the free end portion of said second conduit and said longitudinally extending portion.

7. In combination with a pair of cars each equipped with fluid pressure conduits, a coupler assembly for joining the cars together in fluid-tight communicating relation, said assembly comprising two interlocked couplers carried at the adjacent ends of the coupled cars, one coupler having a shank portion and a head portion rotatable about the longitudinal axis of the shank portion, means connecting said fluid pressure conduits when the couplers are interlocked, said means comprising fluid connecting means associated with each coupler and connecting the fluid pressure conduits on the coupled cars, the fluid connecting means having free end portions projecting from the respective couplers and being in register when the couplers are interlocked, the fluid connecting means associated with one coupler having two portions, one portion being rotatable relative to the other portion about the longitudinal axis of the said shank portion.

8. In combination with a pair of cars each equipped with fluid pressure conduits, a coupler assembly for joining the cars together in fluid-tight communicating relation, said assembly comprising two interlocked couplers carried at the adjacent ends of the coupled cars, one coupler having a shank portion and a head portion rotatable about the longitudinal axis of the shank portion, means connecting said fluid pressure conduits when the couplers are interlocked, said means comprising fluid connecting means associated with each coupler and connecting the fluid pressure conduits on the coupled cars, the fluid connecting means opening onto the coupling face of the respective couplers and being in register when the couplers are interlocked, the fluid connecting means associated with one coupler having two portions, the adjacent ends of the said two portions being telescopically arranged and movable longitudinally relative to each other along the longitudinal axis of the assembly.

9. A coupler assembly as set forth in claim 7 characterized by the adjacent ends of the said two fluid connecting means being telescopically arranged and movable longitudinally relative to each other, and means associated with each portion of the fluid connecting means at their junction of movement to prevent leakage of fluid at said junction.

10. A car coupler assembly comprising a draw-bar, a coupler head carried by the draw-bar for rotation about the longitudinal axis of the draw-bar and adapted to interlock with a companion head, a conduit carried by the coupler head and a second conduit extending longitudinally through the draw-bar and having at one end a rotatable air-tight connection with the first said conduit, means at the other end of the second conduit to receive a fluid connection, the first said conduit having a resilient free end portion opening at the forward face of the coupler head and arranged to register with an end portion opening at the forward face of a companion coupler and form a fluid-tight engagement therewith.

11. A car coupler assembly adapted to couple with a companion coupler comprising a coupler head, a rearwardly projecting draw-bar associated with the coupler head, said coupler head being rotatable about the longitudinal axis of the draw-bar, an anchor pivotally attached to one end of the draw-bar for attachment to a car to support the head and draw-bar from a car and permit the head and draw-bar to pivot laterally relative to the anchor, means associated with the said end of the draw-bar and with the anchorage, the said means including a centering link as described and a longitudinally disposed spring pressed conduit member carried by the draw-bar in a longitudinally disposed relation to the car when uncoupled, means at one end of the conduit member to attach to a fluid pressure connection, an upstanding conduit member carried by the coupler head and having at one end a slidable and rotatable air-tight connection with the other end of the first said conduit member, the other end of the upstanding conduit member provided with a resilient end portion having an opening associated with the forward face of the coupler head and arranged to register with a like opening associated with the forward face on a companion coupler.

12. In combination with a pair of cars equipped with fluid pressure conduits, a coupler assembly for joining the cars together and simultaneously, automatically connecting said fluid pressure conduits together in fluid-tight communicating relation, said assembly comprising a male head, a draw-bar connected to said head and pivoted to one car, a female head carried by the other car for interlocking engagement with said male head, and means associated with each coupler head connecting said fluid pressure conduits when the heads are interlocked, said means comprising a conduit communicating with one of the fluid pressure conduits and carried by the female head, and a second conduit extending through the draw-bar and communicating with the other fluid pressure conduit, said conduits each having resilient free end portions disposed in register for automatic communicating connection when the heads are moved into said interlocking engagement, and said second conduit comprising a plurality of segments including a separately formed intermediate segment disposed in the male head at an angle to two adjacent segments and having an opening to receive an end portion of one of said adjacent segments and a seat to engage the said adjacent element slidably and fluid-tightly, said intermediate segment being rotatable relative to the cars about the coupler assembly longitudinal axis, and spring means in the male head maintaining said intermediate and adjacent segments together fluid-tightly and means associated with the male head resiliently opposing relative rotational motion of the male head and the draw-bar.

13. A rotary car coupler comprising a coupler head, an inner coupler part, an outer coupler part adapted to couple with said coupler head and being rotatably mounted on said inner coupler part for rotation through more than 90 degrees about a substantially horizontal axis, a nipple member positioned within the interior of said outer coupler part, a conduit extending from said nipple to the exterior of said outer coupler part, and a conduit carried by said inner coupler part and rotatably sealed with respect to said nipple member to conduct a pressure medium through the inner coupler part to said nipple and passage.

14. A rotary car coupler comprising separable coupling heads of different construction, a shank portion projecting rearwardly from one of said coupling heads, a draw-bar projecting into said shank portion and upon which said one coupling head is mounted for rotation through more than 90 degrees about a substantially horizontal axis, passageways in said one coupling head and in said draw-bar, and means connecting said passageways together substantially concentric with said axis whereby a pressure medium may flow between the passageways, said means maintaining said connection during rotation of said one coupling head.

15. A rotary car coupler comprising separable coupling heads, a draw-bar, means rotatably mounting one of said coupling heads upon said draw-bar for rotation through at least 120 degrees about a substantially horizontal axis, a first passageway carried by said one coupling head, a second passageway carried by said draw-bar, and sealing means connecting said first and second passageways while permitting relative rotation thereof about said axis.

16. In a haulage system the combination of a pair of cars provided with fluid pressure lines mounted thereon and separable cooperating coupler heads each connected to a car, at least one of the connections between one coupler head and its associated car comprising in part a draw-bar upon which the coupler head is mounted for rotation about a substantially horizontal axis whereby said cars may while coupled rotate relative to each other about said axis, conduit means carried by said rotatable coupler head and the connected draw-bar and connected to the fluid pressure line of the associated car, the conduit means of said rotatable head and associated draw-bar including a rotatable seal positioned substantially concentric with said axis.

17. In a haulage system the combination of a pair of cars provided with fluid pressure lines mounted thereon, a female coupler head carried by one car, a cooperating male coupler head carried by the other car and mounted for rotation about a substantially horizontal axis, conduit means carried by said male coupler and connected to the fluid pressure line of the associated car, a rotatable seal means included in the said conduit means of the said rotatable coupler head and rotatable about an axis substantially concentric with said horizontal axis.

18. A rotary car coupler comprising in combination, a female coupler head, a male coupler head adapted to couple with said female coupler head, a draw-bar projecting into said male coupler head and supporting the same for relative rotation about a substantially horizontal axis, a nipple member formed on the interior of said male coupler head, a passage extending laterally outward from said nipple to the exterior of said male coupler head, and a conduit carried by said draw-bar and rotatably sealed with respect to said nipple member to conduct a pressure medium through the draw-bar to the nipple and passage.

19. In an automatic railway coupling device, a coupler comprising a head and a draw-bar, a coupling therebetween accommodating relative rotation between the head and the draw-bar on the longitudinal axis of the device, a fluid conduit adapted for connection at a point spaced from said longitudinal axis to associated fluid conduit means comprising a portion in said head extending transversely of the coupler and a portion in said draw-bar, the adjacent ends of said portions in the head and draw-bar being arranged coaxially with said axis, and distortable resilient means compressed at said ends of the portions and affording a fluid-tight flexible rotatable connection between said portions through said coupling.

20. A railway car automatic coupling comprising mated couplers having meeting faces, one of said couplers comprising an integral head and shank, the latter being connected to one car body, and the other of said couplers comprising a draw-bar connected to another car body, and a head element having a rotatable connection with said draw-bar for rotation on a substantially longitudinal axis extending through the before-mentioned connections, interconnected fluid conduits in said couplers intersecting the meeting faces when the heads are coupled, the fluid conduit in said other coupler comprising a portion in said head element and a portion in said draw-bar arranged end to end through said rotatable connection between said elements substantially coaxially with said axis, and a flexible, fluid-tight, rotatable connection between adjacent ends of said portions accommodating rotative movement therebetween, said elements engaging along rigid areas for transmitting buffing forces to each other.

21. An automatic railway car coupler comprising a draw-bar adapted for connection to an associated car body, a head rotatably connected to said draw-bar for rotation on an axis extending longitudinally of the coupler, conduit means comprising a portion carried by said head and extending transversely of the coupler in a vertical direction and a portion carried by said draw-bar arranged at adjacent ends coaxially with said axis, and a flexible, fluid-tight rotatable connection between said ends accommodating rotation of said portions coincidentally with the rotation between said head and draw-bar and connecting said portions during said rotation.

22. In an automatic railway coupling device, a coupler comprising a head for automatic mating with a companion head, a draw-bar adapted for connection to its associated car, a rotatable connection between the head and draw-bar, and a fluid conduit having a portion in the head and a portion in the draw-bar, and a fluid-tight rotatable connection between said portions coaxial with said axis whereby relative rotation between said draw-bar and head will not disconnect said portions.

23. In a haulage system including a pair of cars equipped with fluid pressure hoses, a coupler assembly comprising a coupler head carried by each car for interlocking engagement with each other to secure the cars together in end to end relation, and a conduit carried by one coupler head and communicating with one hose, the combination of a segmented conduit carried by the other head and communicating with the other hose and arranged to automatically engage and communicate with the other conduit as the said heads move into coupled relation, said segmented conduit including a segment rotatable relative to the cars about the coupler assembly longitudinal axis and extending transversely of said axis and having an open end portion disposed substantially coaxially of the coupler assembly for communicating connection to the said other hose and another open end portion spaced from said longitudinal axis for communicating engagement with the conduit carried by said one coupler.

24. In a haulage system including a pair of cars equipped with fluid pressure hoses, a coupler assembly comprising a coupler head carried by each car for interlocking engagement with each other to secure the cars together in end to end relation, a conduit carried by one coupler head and communicating with one hose, and a draw-bar connected to the other head and pivoted to the end of one of the cars, the combination of a segmented conduit carried by the said other head and communicating with the other hose to engage and communicate with the other conduit when the said heads are interlocked, said segmented conduit including a segment in communicating connection with said other hose and associated with and extending longitudinally of the draw bar for movement therewith, and a second segment extending transversely of the coupler assembly for connection to the conduit carried by said one coupler head and having an open end portion disposed substantially coaxially of the coupler assembly for communicating engagement with the first segment.

25. A railway car coupler comprising a first part to be connected to a car for limited sidewise swinging movement, a second part to be connected non-rotatably to a coupler connected to another car, means connecting said first and second parts for relative rotational movement through at least 120° about an axis extending longitudinally of the coupler, a fluid conduit connected to and movable with said first part, a fluid conduit connected to and movable with said second part and means constituting a rotatable, fluid-tight connection between adjacent ends of said conduits and coaxial with said longitudinal axis.

References Cited in the file of this patent

UNITED STATES PATENTS

| Number | Name | Date |
|---|---|---|
| 1,094,612 | Tomlinson | Apr. 28, 1914 |
| 1,129,323 | Westinghouse | Feb. 23, 1915 |
| 1,296,230 | Thiem et al. | Mar. 4, 1919 |
| 2,235,618 | Larsson | Mar. 18, 1941 |